Patented May 29, 1945

2,376,897

UNITED STATES PATENT OFFICE 2,376,897

LIQUID TREATMENT

Abraham Sidney Behrman, Chicago, and Hilding B. Gustafson, La Grange, Ill., assignors to Infilco Incorporated, a corporation of Delaware No Drawing. Application September 11, 1939, Serial No. 294,288

3 Claims. (Cl. 210—23)

This invention relates to the treatment of liquids, and is concerned particularly with new and improved methods for the removal of undesirable impurities from water and other aqueous liquids.

More especially, the invention is directed to improvements in the method of removing silica and fluorine from water by means of magnesium hydroxide precipitated in the water.

As is now well known, the presence of fluorine in excess of 1.0 part per million is highly objectionable in a potable water supply, since fluorine in such quantities has been shown definitely to be responsible for endemic dental fluorosis, more commonly known as "mottled tooth enamel." It is likewise well known that the presence of silica in excess of a few parts per million is highly undesirabe in the feed-water supply of modern high pressure boilers in which rapid and unimpeded heat transfer is imperative, due to the hazard of the formation of a siliceous scale on the boiler tubes which is such an effective thermal insulator that local overheating and failure of the tubes may readily result.

It was shown by Scott and his associates (Journal American Water Works Association, volume 29, pages 9–25, 1937) that fluorine in magnesium-containing waters could be reduced by softening the water with lime to precipitate magnesium hydroxide which apparently adsorbs the fluorine; and that, if the amount of magnesium compounds originally present in the water was not sufficient for the purpose, a further reduction of the fluorine content could be accomplished by adding a soluble magnesium compound (such as the sulfate or chloride) to the water to form a correspondingly increased amount of magnesium hydroxide on subsequent lime treatment.

It has also been found that silica in water may likewise be removed by magnesium hydroxide precipitated in the water. Here again it is possible to increase the degree of silica removal by adding an appropriate amount of a soluble magnesium salt such as magnesium sulfate to the water before precipitation of the magnesium hydroxide. It is of interest to note that we have found that for effective silica removal it is necessary to form the magnesium hydroxide in situ, that is, in the water being treated, and that contact with previously formed solid particles of ordinary magnesium hydroxide is ineffective. Thus, for example, treatment of a given water with dolomitic lime, which, in water, forms magnesium hydroxide instead of the usual high calcium lime accomplishes no greater silica removal, even though of course sufficient excess of the dolomitic lime is employed to provide the proper quantity of calcium hydroxide for precipitation of the magnesium. The addition of ordinary magnesum hydroxide to the water to be treated is to be distinguished from the process of the applicants in which magnesium carbonate is used, as more fully described hereafter; such magnesium carbonate either being previously prepared or prepared in situ by first adding magnesium oxide or hydroxide and then treating with carbon dioxide to form a magnesium carbonate of increased activity.

Unfortunately, however, the addition of magnesium sulfate or chloride to a water for increasing the completeness of silica or fluorine removal increases also the amount of sulfates or chlorides in the treated water. Since, as is characteristic of adsorption phenomena in general, the added magnesium required is an exponential and not a linear function of the amounts of silica or fluorine to be removed, disproportionately large dosages of added magnesium sulfate or chloride are required for progressively more complete removal. In consequence, particularly in the case of silica removal, the amount of salts (usually sodium salts) added to a boiler feed water in this way may be so great as to be an appreciable factor in boiler plant operation, as for example by increasing the frequency or amount of boiler blowdown required to permit reasonably satisfactory boiler operation. It should be borne in mind that for satisfactory silica removal it may be necessary to use dosages of magnesium sulfate (Epsom salts) of as high as 5 to 20 grains per gallon, just as is the case with the current popular employment of anhydrous ferric sulfate. While 1 grain magnesium sulfate per gallon will add to a water after softening only a little more than half as much sodium sulfate as will be produced by 1 grain of anhydrous ferric sulfate, the quantity becomes an important consideration in boiler operation, especially when high dosages of magnesium sulfate are required. It should be noted also that any magnesium sulfate (or chloride) added to the water will require the employment of both lime and soda-ash for precipitation and softening, thus further increasing the cost of water treatment to that extent.

We have discovered that the amount of soluble sulfates (or chlorides, nitrates, etc.) added to a water as a result of the addition of magnesium sulfate (or chloride, nitrate, etc.) for the purpose described can be eliminated completely by adding magnesium to the water in the form of the carbonate or bicarbonate. When subsequently the water is treated with lime for the precipitation of magnesium hydroxide, the carbonate or bicarbonate ion of the magnesium compound is likewise precipitated as calcium carbonate, thus leaving no soluble salts remaining in the water as a result of this treatment. Since this is true regardless of the amount of magnesium carbonate or bicarbonate that may have been added to the water, it follows that as large an addition of magnesium as desired may be made to the water—that is, of course, within the limits of solubility of magnesium carbonate and bicarbonate—without fear of increasing the amount of dissolved salts in the treated water. It thus becomes feasible for the first time to add as much magnesium to the water as is required to give the desired completeness of silica removal.

When the magnesium content of a water is increased for the purpose of improved fluorine removal from a community water supply, the lack of any increase in the amount of soluble salts accruing from the employment of magnesium carbonate or bicarbonate is also very advantageous since the large amount of sulfates or chlorides added to the water if magnesium sulfate or chloride had been utilized can impart a disagreeable taste to the water, especially in those cases where the water may have had an appreciable initial sulfate and chloride content.

Another important advantage resulting from the employment of magnesium carbonate or bicarbonate as a source of added magnesium is that lime only need be used in subsequent treatment for the precipitation of magnesium hydroxide, whereas in the case of magnesium sulfate or chloride both lime and soda-ash (or their equivalent of sodium hydroxide) must be added for the precipitation and softening reactions. The use of magnesium carbonate or bicarbonate therefore makes possible a very marked economy in the cost of treatment.

We prefer to use magnesium carbonate instead of the bicarbonate as far as the solubility of the carbonate will permit, since the bicarbonate requires twice as much lime as the carbonate for the the precipitation of one unit of magnesium.

Most of the methods we have found suitable for adding magnesium carbonate or bicarbonate to the water to be treated depend on the general principle of treating a solid alkaline magnesium compound with a solution of carbon dioxide. A preferred method is to add carbon dioxide from any convenient source to the water to be treated and then pass the water through a bed of magnesium oxide or carbonate. Calcined magnesite has been found quite satisfactory, both physically and chemically, as has also the granular "activated magnesia" now available commercially; since the solid oxide (or hydroxide) is present in excess, normal magnesium carbonate is the principal product resulting from the action of the carbon dioxide. Neither uncalcined magnesite (magnesium carbonate) nor dolomite has been found very satisfactory, due to the comparative lack of reactivity of these materials towards carbon dioxide; furthermore, at least a substantial part of the magnesium carbonate dissolved would be present as the bicarbonate, requiring twice as much lime as the normal carbonate obtained from the oxide. Differentially calcined dolomite may also be utilized—that is, dolomite which has been calcined at a temperature sufficiently high to decompose the magnesium carbonate, but not the calcium carbonate.

Instead of using a bed of granular particles of the alkaline magnesium compound, it is possible to carbonate a suspension of more finely divided material. Where feasible, for example, one may carbonate a suitable sludge from a previous lime treatment. It has been found that magnesium hydroxide can be separated from calcium carbonate in the mixed sludge by treatment with carbon dioxide, provided that the magnesium hydroxide is present in excess and that sufficient time of contact is provided to permit the attainment of equilibrium.

Where flue gases or other combustion gases are employed as a source of carbon dioxide, the maximum concentration of carbon dioxide that can be obtained by contacting these gases with water is of the order of 100 to 200 parts per million, due to the low partial pressure of carbon dioxide. If it is desired to use a larger amount of magnesium carbonate or bicarbonate than could be secured from such concentration of carbon dioxide, the water may be passed through several beds of the alkaline magnesium compound, with treatment with the combustion gases between each pass; or the water may be circulated several times through the bed of alkaline material, with addition of the flue gases during each pass. Another alternative procedure is to pass the combustion gases through the water while it is in contact with the calcined magnesite or other alkaline magnesium compound, thus simultaneously contacting the water with carbon dioxide and the magnesium compound. For example, the water may be passed downwardly, and the combustion gases upwardly, through a bed of calcined magnesite, the rates of flow of the two fluids being proportioned to give the desired degree of solution of the magnesium compound. Or, as previously mentioned, a slurry of the magnesium compound may be treated with the combustion gases.

A novel method for providing the carbon dioxide required for the formation of magnesium carbonate or bicarbonate, and one which is highly efficient within its proper field of usefulness, consists essentially in first passing the raw water to be treated through a bed of hydrogen exchange material, such as the "carbonaceous zeolites," certain types of synthetic resins, or other products now available for this purpose, whereby the positive ions of the compounds present in the water are replaced with hydrogen, the treated water thus containing the corresponding acids—typically carbonic, sulfuric, and hydrochloric. Ordinarily, however, for the purpose at hand, when the alkalinity of the raw water is sufficient, we prefer to control the hydrogen exchange so that, in effect, only the bicarbonates are converted to the corresponding acid (i. e. carbonic acid), while the sulfates and chlorides are not affected; for obviously the carbonic acid and free carbon dioxide resulting from the hydrogen exchange will serve the specific purpose involved most effectively and economically.

To exemplify the method just described: A natural water having a silica content of 28 P. P. M., an alkalinity of 390 P. P. M. and a hardness of 368 P. P. M. was subjected to hydrogen exchange treatment and then passed through a bed of calcined magnesite, which increased the phenolphthalein alkalinity to 212 P. P. M. and the methyl-orange alkalinity to 524 P. P. M. When this water was subsequently treated with lime, the characteristics of the treated water were as follows: phenolphthalein alkilinity 54

P. P. M., methyl-orange alkalinity 76 P. P. M., hardness 88 P. P. M. and silica 2 P. P. M. In a second case, a water having initial hardness of 59 P. P. M., alkalinity 122 P. P. M., and silica 72 P. P. M. was similar subjected to hydrogen zeolite treatment and then passed through a bed of calcined magnesite, after which it had a phenolphthalein alkalinity of 120 P. P. M. and methyl-orange alkalinity of 260 P. P. M. On subsequent treatment with lime the silica was reduced to 10 P. P. M.

Another water, which contained both silica and fluorine in objectionable amount, had an initial hardness of 241 P. P. M., alkalinity 354 P. P. M., silica 64 P. P. M., and fluorine 1.3 P. P. M. After progressive treatment with hydrogen zeolite and with calcined magnesite, the phenolphthalein alkalinity was 240 P. P. M. and the methyl-orange alkalinity 568 P. P. M. On subsequent treatment with lime to precipitate the magnesium, the silica content was reduced to 2 P. P. M. and the fluorine content to 0.2 P. P. M.

It is thus evident that our invention makes possible marked improvements in methods for removing silica and fluorine, and for the removal of any other substance which it is desired to adsorb with magnesium hydroxide without leaving in the liquid undesirable soluble compounds as a result of the treatment. Various modifications and applications of our invention will naturally occur to those skilled in the art. All such ramifications of our invention are contemplated as coming within its scope as defined in the claims. It will be understood that the term "magnesium carbonate" as used in the claims includes both the normal carbonate and the bicarbonate.

We claim:

1. A process for treating water which comprises subjecting the water successively to hydrogen exchange treatment and thereby producing carbon dioxide in the water, to contact with a body of a compound taken from the class consisting of magnesium oxide and magnesium hydroxide, thereby producing magnesium carbonate in the water, to treatment with a hydroxide capable of reacting with the magnesium carbonate to produce magnesium hydroxide for the precipitation of magnesium as magnesium hydroxide, and separating the precipitated magnesium from the water.

2. A process for removing from a bicarbonate water impurities of the class consisting of silica and fluorine which comprises successively producing carbon dioxide in the water by hydrogen exchange treatment, contacting this water with a body of a compound taken from the class consisting of magnesium oxide and magnesium hydroxide to form magnesium carbonate in the water, precipitating magnesium hydroxide from the water by treatment with lime, and separating the precipitate from the water.

3. A process according to claim 2 in which the hydrogen exchange is controlled so as to decompose only bicarbonate without conversion of sulfates and chlorides to free sulfuric and hydrochloric acid.

ABRAHAM SIDNEY BEHRMAN.
HILDING B. GUSTAFSON.